United States Patent
Chen

(10) Patent No.: US 10,922,406 B2
(45) Date of Patent: Feb. 16, 2021

(54) PROTECTING METHOD AND SYSTEM FOR MALICIOUS CODE, AND MONITOR APPARATUS

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 319 days.

(21) Appl. No.: 15/275,502

(22) Filed: Sep. 26, 2016

(65) Prior Publication Data
US 2017/0337374 A1    Nov. 23, 2017

(30) Foreign Application Priority Data

May 23, 2016   (TW) .................................. 105115962

(51) Int. Cl.
*G06F 21/56* (2013.01)

(52) U.S. Cl.
CPC .......... *G06F 21/561* (2013.01); *G06F 21/566* (2013.01); *G06F 2221/034* (2013.01)

(58) Field of Classification Search
CPC ................. G06F 21/561; G06F 21/566; G06F 2221/034; H04L 63/145
USPC ................................................ 726/4, 23, 24
See application file for complete search history.

(56) References Cited

U.S. PATENT DOCUMENTS

| | | | | |
|---|---|---|---|---|
| 5,511,163 A | * | 4/1996 | Lerche | G06F 21/564 714/28 |
| 6,785,818 B1 | * | 8/2004 | Sobel | G06F 21/552 713/187 |
| 7,299,277 B1 | * | 11/2007 | Moran | H04L 41/5022 370/230 |
| 7,472,420 B1 | * | 12/2008 | Pavlyushchik | G06F 21/55 707/999.2 |

(Continued)

FOREIGN PATENT DOCUMENTS

| CN | 201726425 U | * | 1/2011 |
|---|---|---|---|
| CN | 102467321 A | * | 5/2012 |

(Continued)

OTHER PUBLICATIONS

Lindorfer, Martina, Alessandro Di Federico, Federico Maggi, Paolo Milani Comparetti, and Stefano Zanero. "Lines of malicious code : insights into the malicious software industry." In Proceedings of the 28th Annual Computer Security Applications Conference, pp. 349-358. ACM, 2012. (Year: 2012).*

(Continued)

*Primary Examiner* — Luu T Pham
*Assistant Examiner* — Walter J Malinowski
(74) *Attorney, Agent, or Firm* — JCIPRNET

(57) ABSTRACT

A protecting method and system for malicious code, and a monitor apparatus are provided. The monitor apparatus circulates a monitor module obtained from a combination of a plurality of antivirus systems in a communication system, so as to monitor a plurality of electronic apparatuses in the communication system. When the monitor module is circulated to one of the electronic apparatuses and the malicious code is detected, a protection result is decided and one or more corresponding process actions are executed based on the protection result by the monitor module.

10 Claims, 2 Drawing Sheets

(56) References Cited

U.S. PATENT DOCUMENTS

| | | | | |
|---|---|---|---|---|
| 7,490,244 B1* | 2/2009 | Kennedy | G06F 21/566 | 713/188 |
| 7,900,251 B1* | 3/2011 | Cheriton | G06F 21/554 | 709/224 |
| 7,917,393 B2* | 3/2011 | Valdes | H04L 41/0631 | 705/50 |
| 8,125,898 B1* | 2/2012 | Strayer | H04L 63/1458 | 370/230 |
| 8,302,192 B1* | 10/2012 | Cnudde | H04L 63/145 | 726/22 |
| 9,396,334 B1* | 7/2016 | Ivanov | G06F 16/188 | |
| 9,516,053 B1* | 12/2016 | Muddu | H04L 63/1425 | |
| 9,680,843 B2* | 6/2017 | Murynets | H04L 63/1433 | |
| 2003/0021280 A1* | 1/2003 | Makinson | H04L 63/0209 | 370/401 |
| 2003/0120951 A1* | 6/2003 | Gartside | G06F 21/562 | 726/4 |
| 2003/0191957 A1* | 10/2003 | Hypponen | G06F 21/561 | 726/24 |
| 2004/0010443 A1* | 1/2004 | May | G06Q 10/0635 | 705/7.28 |
| 2004/0168085 A1* | 8/2004 | Omote | H04L 29/06 | 726/25 |
| 2004/0243799 A1* | 12/2004 | Hacigumus | G06F 17/30463 | 713/150 |
| 2005/0050359 A1* | 3/2005 | Liang | H04L 63/1408 | 726/4 |
| 2005/0050378 A1* | 3/2005 | Liang | G06F 21/56 | 714/4.11 |
| 2005/0071432 A1* | 3/2005 | Royston, III | G06F 21/55 | 709/206 |
| 2005/0086499 A1* | 4/2005 | Hoefelmeyer | G06F 21/567 | 713/188 |
| 2005/0149749 A1* | 7/2005 | Van Brabant | G06F 21/564 | 726/24 |
| 2005/0246767 A1* | 11/2005 | Fazal | H04L 63/065 | 726/11 |
| 2006/0101282 A1* | 5/2006 | Costea | G06F 21/56 | 713/188 |
| 2006/0217063 A1* | 9/2006 | Parthasarathy | H04B 1/0003 | 455/39 |
| 2008/0104101 A1* | 5/2008 | Kirshenbaum | G06F 17/30539 | |
| 2008/0120720 A1* | 5/2008 | Guo | G06F 21/552 | 726/23 |
| 2008/0134330 A1* | 6/2008 | Kapoor | G06F 9/505 | 726/22 |
| 2008/0184371 A1* | 7/2008 | Moskovitch | G06F 21/566 | 726/24 |
| 2009/0100162 A1* | 4/2009 | Holostov | G06F 15/16 | 709/223 |
| 2009/0133123 A1* | 5/2009 | Radha | H04L 63/1416 | 726/24 |
| 2009/0141652 A1* | 6/2009 | Canright | H04L 41/12 | 370/254 |
| 2009/0172821 A1* | 7/2009 | Daira | G06F 21/552 | 726/27 |
| 2010/0122120 A1* | 5/2010 | Lin | G06F 21/55 | 714/47.3 |
| 2010/0202299 A1* | 8/2010 | Strayer | H04L 63/1408 | 370/252 |
| 2011/0238855 A1* | 9/2011 | Korsunsky | G06F 21/55 | 709/231 |
| 2011/0320816 A1* | 12/2011 | Yao | G06F 21/316 | 713/171 |
| 2012/0079596 A1* | 3/2012 | Thomas | G06F 21/55 | 726/24 |
| 2012/0084859 A1* | 4/2012 | Radinsky | G06F 21/56 | 726/23 |
| 2012/0310864 A1* | 12/2012 | Chakraborty | G06K 9/6262 | 706/12 |
| 2013/0007883 A1* | 1/2013 | Zaitsev | G06F 21/567 | 726/24 |
| 2013/0091575 A1* | 4/2013 | Duncan | G06F 21/56 | 726/24 |
| 2013/0147187 A1* | 6/2013 | Yamada | F16L 37/133 | 285/319 |
| 2013/0174256 A1* | 7/2013 | Powers | H04L 63/145 | 726/23 |
| 2013/0190008 A1* | 7/2013 | Vathsangam | H04M 1/00 | 455/456.1 |
| 2013/0291112 A1* | 10/2013 | Shue | G06F 21/561 | 726/24 |
| 2013/0326625 A1* | 12/2013 | Anderson | G06F 21/56 | 726/23 |
| 2014/0047544 A1* | 2/2014 | Jakobsson | G06F 21/55 | 726/23 |
| 2014/0181975 A1* | 6/2014 | Spernow | G06F 21/562 | 726/23 |
| 2014/0207833 A1* | 7/2014 | Xie | G06F 17/3007 | 707/822 |
| 2014/0223560 A1* | 8/2014 | Christodorescu | G06F 21/56 | 726/23 |
| 2014/0237595 A1* | 8/2014 | Sridhara | H04L 63/1408 | 726/23 |
| 2014/0237599 A1* | 8/2014 | Gertner | H04L 63/1441 | 726/24 |
| 2014/0289833 A1* | 9/2014 | Briceno | H04L 63/08 | 726/7 |
| 2014/0289851 A1* | 9/2014 | Klein | G06F 21/566 | 726/23 |
| 2014/0289853 A1* | 9/2014 | Teddy | H04L 63/145 | 726/23 |
| 2014/0337862 A1* | 11/2014 | Valencia | G06F 8/71 | 719/313 |
| 2014/0359772 A1* | 12/2014 | McCormack | G06F 21/60 | 726/24 |
| 2015/0007331 A1* | 1/2015 | Pfeifer, Jr. | H04L 63/1433 | 726/25 |
| 2015/0096018 A1* | 4/2015 | Mircescu | G06F 21/51 | 726/23 |
| 2015/0106311 A1* | 4/2015 | Birdwell | G06N 3/02 | 706/20 |
| 2015/0121450 A1* | 4/2015 | Chen | H04L 63/0227 | 726/1 |
| 2015/0128259 A1* | 5/2015 | Suzuki | G06F 21/57 | 726/22 |
| 2015/0128262 A1* | 5/2015 | Glew | G06F 21/554 | 726/23 |
| 2015/0128263 A1* | 5/2015 | Raugas | H04L 63/1408 | 726/23 |
| 2015/0135262 A1* | 5/2015 | Porat | G06F 21/552 | 726/1 |
| 2015/0135317 A1* | 5/2015 | Tock | G06F 21/56 | 726/23 |
| 2015/0135320 A1* | 5/2015 | Coskun | H04L 63/1425 | 726/24 |
| 2015/0150131 A1* | 5/2015 | Boutnaru | G06F 21/567 | 726/23 |
| 2015/0229652 A1* | 8/2015 | Liu | H04L 67/12 | 726/24 |
| 2015/0281260 A1* | 10/2015 | Arcamone | H04L 63/1408 | 726/11 |
| 2015/0286490 A1* | 10/2015 | Chen | G06F 9/45558 | 718/1 |
| 2015/0302192 A1* | 10/2015 | Yarykin | G06F 21/64 | 726/24 |
| 2015/0356451 A1* | 12/2015 | Gupta | G06N 20/00 | 706/52 |
| 2016/0012235 A1* | 1/2016 | Lee | G06Q 10/0635 | 726/25 |
| 2016/0028753 A1* | 1/2016 | Di Pietro | H04L 63/1425 | 726/23 |
| 2016/0050205 A1* | 2/2016 | Heller | G06F 21/629 | 726/4 |
| 2016/0078362 A1* | 3/2016 | Christodorescu | G06F 21/566 | 706/12 |
| 2016/0164901 A1* | 6/2016 | Mainieri | G06N 7/005 | 726/23 |

(56) References Cited

U.S. PATENT DOCUMENTS

| | | | | |
|---|---|---|---|---|
| 2016/0182451 | A1* | 6/2016 | Nandagopal | H04L 63/0245 726/12 |
| 2016/0191559 | A1* | 6/2016 | Mhatre | H04L 63/1416 726/23 |
| 2016/0226903 | A1* | 8/2016 | Arcamone | H04L 63/1425 |
| 2016/0269247 | A1* | 9/2016 | Chakradhar | H04L 67/12 |
| 2016/0275289 | A1* | 9/2016 | Sethumadhavan | G06F 21/552 |
| 2016/0306971 | A1* | 10/2016 | Anderson | G06F 21/563 |
| 2016/0337390 | A1* | 11/2016 | Sridhara | G06F 3/0484 |
| 2016/0371490 | A1* | 12/2016 | Shakarian | G06N 99/005 |
| 2017/0032130 | A1* | 2/2017 | Joseph Durairaj | G06F 21/552 |
| 2017/0046510 | A1* | 2/2017 | Chen | G06F 21/552 |
| 2017/0091461 | A1* | 3/2017 | Tin | G06F 21/564 |
| 2017/0093902 | A1* | 3/2017 | Roundy | G06F 21/552 |
| 2017/0147722 | A1* | 5/2017 | Greenwood | G06F 17/50 |
| 2017/0220798 | A1* | 8/2017 | Madou | G06F 21/552 |

FOREIGN PATENT DOCUMENTS

| | | | | | |
|---|---|---|---|---|---|
| JP | 54070745 | A | * | 6/1979 | |
| JP | 10313337 | A | * | 11/1998 | |
| JP | 2002342210 | A | * | 11/2002 | |
| JP | 2008252729 | A | * | 10/2008 | |
| JP | 2013207783 | A | * | 10/2013 | |
| KR | 20040056998 | A | * | 7/2004 | |
| KR | 20150114437 | A | * | 10/2015 | G06K 9/4609 |

OTHER PUBLICATIONS

Zhang, FuYong, DeYu Qi, and JingLin Hu. "MBMAS: a system for malware behavior monitor and analysis." In Computer Network and Multimedia Technology, 2009. CNMT 2009. International Symposium on, pp. 1-4. IEEE, 2009. (Year: 2009).*

Jiang, Xuxian, Xinyuan Wang, and Dongyan Xu. "Stealthy malware detection and monitoring through VMM-based "out-of-the-box" semantic view reconstruction." ACM Transactions on Information and System Security (TISSEC) 13, No. 2 (2010): 1-28. (Year: 2010).*

Chen, Lin, Bo Liu, Huaping Hu, and Qianbing Zheng. "A layered malware detection model using VMM." In 2012 IEEE 11th International Conference on Trust, Security and Privacy in Computing and Communications, pp. 1259-1264. IEEE, 2012. (Year: 2012).*

Grande et al., "Nonparametric adaptive control using Gaussian Processes with online hyperparameter estimation," IEEE 52nd Annual Conference on Decision and Control (CDC), Dec. 10-13, 2013, pp. 1-7.

Ahmed et al., "Dynamic Non-Parametric Mixture Models and The Recurrent Chinese Restaurant Process : with Applications to Evolutionary Clustering," Proceedings of the SIAM International Conference on Data Mining(SDM), Apr. 24-26, 2008, pp. 1-12.

* cited by examiner

PROTECTING METHOD AND SYSTEM FOR MALICIOUS CODE, AND MONITOR APPARATUS

CROSS-REFERENCE TO RELATED APPLICATION

This application claims the priority benefit of Taiwan application serial no. 105115962, filed on May 23, 2016. The entirety of the above-mentioned patent application is hereby incorporated by reference herein and made a part of this specification.

BACKGROUND OF THE INVENTION

Field of the Invention

The invention relates to a data security mechanism, and particularly relates to a protecting method and system for malicious code, and a monitor apparatus.

Description of Related Art

With the development and innovation of science and technology, internet facilitates global information exchange. Also, lifestyle of more and more people is gradually integrated into a virtual world from a real society. Thus, many people are willing to attack maliciously through the internet. A computer virus is one of malicious programs, which may make the program self-replicate, infect other normal programs in a computer, or damage a computer system, thereby causing the computer can not work normally.

With the popularity of the Internet of Things (IoT), the number and type of the virus are significantly increased. Traditional antivirus systems need to obtain virus patterns, and then build the virus patterns by artificially studying behaviors thereof to deploy, which is time-consuming, labor-consuming, and costly. In the generation of IoT, the traditional antivirus systems have not kept up with the speed of evolution of the virus. There is a need for a way to make the antivirus systems evolve with the virus, which is fast enough.

SUMMARY OF THE INVENTION

The invention provides a protecting method and system for malicious code, and a monitor apparatus, which combines a variety of antivirus systems for an evolution direction of the malicious code so as to form a monitor module, such that the monitor module moves toward a better direction and evolves independently.

The invention provides a protecting method for malicious code including the following steps. A monitor module obtained from a combination of a plurality of antivirus systems is circulated in a communication system by a monitor apparatus, so as to monitor at least one electronic apparatus in the communication system. When the monitor module is circulated to one of the electronic apparatuses in the communication system, whether there is a malicious code is detected by the monitor module. When the malicious code is detected by the monitor module, a protection result is decided by the monitor module, and one or more corresponding process actions are executed based on the protection result. Herein, when the malicious code is detected by the monitor module, the step of obtaining the protection result by the monitor module includes that, in a condition that the monitor module is an admixture model, at least one of the antivirus systems is selected as a selected module, and the protection result corresponding to the malicious code is obtained by the selected module; in a condition that the monitor module is an association model, the protection result corresponding to the malicious code is obtained by associating the antivirus systems.

According to an embodiment of the invention, in the condition that the monitor module is the admixture model, the protecting method for malicious code includes that, based on an evolution bias vector decided by the monitor apparatus, one of the plurality of antivirus systems is selected as the selected module. Based on a probability vector decided by the selected module, a representative cluster corresponding to the malicious code is identified by the selected module. A set of the process actions corresponding to the representative cluster is identified according to the evolution bias vector and the probability vector, and the set of process actions is used as the protection result.

According to an embodiment of the invention, in the condition that the monitor module is the association model, the protecting method for malicious code includes that, an evolution bias vector decided by the monitor apparatus is obtained, wherein the evolution bias vector decides a correlation weight between each the antivirus system and the malicious code. In each the antivirus system, based on a probability vector decided by each the antivirus system, a representative cluster corresponding to the malicious code in each the antivirus system is identified. A set of the process actions corresponding to the plurality of representative clusters of the antivirus systems is identified according to the evolution bias vector and the probability vector, and the set of process actions is used as the protection result.

According to an embodiment of the invention, after deciding the protection result by the monitor module, the protecting method for malicious code further includes that, a multi objective optimization algorithm is executed to obtain an optimal objective solution from a plurality of objective solutions included in the protection result, so as to set the optimal objective solution as the final process action.

According to an embodiment of the invention, the protecting method for malicious code further includes that, a plurality of aggressive behaviors corresponding to the malicious code received from the electronic apparatus are analyzed to obtain a behavior characteristic vector by the monitor apparatus, and a behavior prediction is executed based on the behavior characteristic vector to obtain an evolution bias vector wherein the evolution bias vector relates to the malicious code and the plurality of antivirus systems included in the monitor module. When an abnormal message is received from one of the electronic apparatuses, the monitor module is circulated to the electronic apparatus which transmits the abnormal message, and whether there is the malicious code is detected by the monitor module.

According to an embodiment of the invention, the plurality of antivirus systems included in the monitor module are a tree hierarchical structure, and a plurality of layers of the tree hierarchical structure belong to the admixture model or the association model respectively.

The invention provides a protecting system for malicious code including an electronic apparatus and a monitor apparatus. The electronic apparatus and the monitor apparatus are located in a communication system. The monitor apparatus communicates with each the electronic apparatus by a communication device and circulates a monitor module obtained from a combination of a plurality of antivirus systems in the communication system, so as to monitor each the electronic apparatus in the communication system.

When the monitor module is circulated to the electronic apparatus, the electronic apparatus detects whether there is a malicious code by the monitor module. Also, when the malicious code is detected by the monitor module, the electronic apparatus decides a protection result by the monitor module and executes one or more corresponding process actions based on the protection result. Herein, when the malicious code is detected by the monitor module in a condition that the monitor module is an admixture model, the electronic apparatus selects at least one of the antivirus systems as a selected module and obtains the protection result corresponding to the malicious code by the selected module. When the malicious code is detected by the monitor module in a condition that the monitor module is an association model, the electronic apparatus obtains the protection result corresponding to the malicious code by associating the antivirus systems.

The invention provides a monitor apparatus including a communication device, a storage device, and a processor. The processor is coupled to the communication device and the storage device. The communication device establishes a connection with an electronic apparatus of a communication system. The storage device includes a behavior analysis module and a behavior prediction module. The processor circulates a monitor module obtained from a combination of a plurality of antivirus systems to the electronic apparatus in the communication system by the communication device, so as to monitor the electronic apparatus in the communication system. The processor drives the behavior analysis module to analyze at least one aggressive behavior corresponding to at least one malicious code received from the electronic apparatus to obtain a behavior characteristic vector, and the processor drives the behavior prediction module to execute a behavior prediction based on the behavior characteristic vector to obtain an evolution bias vector wherein the evolution bias vector relates to the malicious code and the antivirus systems included in the monitor module, so as to decide that the monitor module selects at least one of the plurality of antivirus systems to decide a protection result or associates the plurality of antivirus systems to decide the protection result by the evolution bias vector.

Based on the above, the monitor module obtained from a combination of the plurality of antivirus systems is circulated in the communication system by the monitor apparatus, so as to monitor each the electronic apparatus in the communication system. By the analysis of the monitor apparatus, a variety of antivirus systems can be combined for the evolution direction of the malicious code to form the monitor module, such that the monitor module moves toward a better direction and evolves independently.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
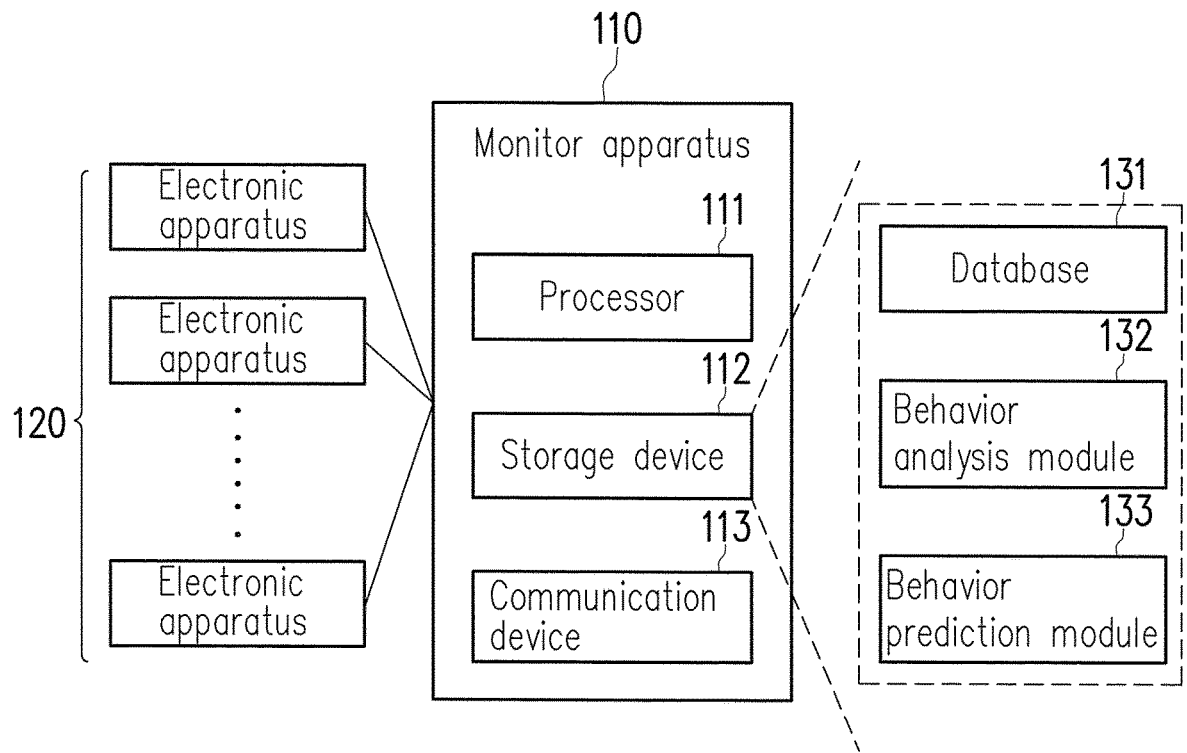
FIG. 1 is a schematic diagram of a protecting system for malicious code according to an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of a protecting system for malicious code according to an embodiment of the invention. The protecting system includes a monitor apparatus 110 and a plurality of electronic apparatuses 120. Herein, the protecting system is established on an architecture of Internet of Things (IoT), for example.

The monitor apparatus 110 is an apparatus having intelligence and is able to analyze the malicious code, such as a server with high computing power. The electronic apparatuses 120 are servers, personal computers, notebooks, tablets, smart phones, wearable devices, smart appliances, and other electronic apparatuses having computing power and networking functions. That is, the electronic apparatus 120 includes a processor and a communication device (not shown).

The monitor apparatus 110 includes a processor 111, a storage device 112, and a communication device 113. The processor 111 is coupled to the storage device 112 and the communication device 113. The monitor apparatus 110 communicates with each the electronic apparatus 120 by the communication device 113 connected to the Internet. Also, the monitor apparatus 110 circulates a plurality of antivirus systems or a monitor module combined by a plurality of antivirus systems in the communication system by the communication device 113, so as to monitor whether there is the malicious code in one or more electronic apparatuses 120 under the communication system.

The malicious code is a computer virus, a computer worm, a trojan horse, a ransomware, a spyware, an adware, or a scareware, for example.

The processor 111 is a central processing unit (CPU), a programmable microprocessor, an embedded control chip, a digital signal processor (DSP), an application specific integrated circuit (ASIC), or other similar apparatuses, for example. The storage device 112 is non-volatile memory, random access memory (RAM), or a hard disk, for example. The communication device 113 is a chip for supporting wired or wireless communication protocol, for example.

The storage device 112 includes a database 131, a behavior analysis module 132, and a behavior prediction module 133. The database 131 stores a plurality of antivirus systems, such that the processor 111 circulates at least one antivirus system in the communication system through the communication device 113.

The behavior analysis module 132 receives a plurality of aggressive behaviors of one malicious code from one or more antivirus systems in each the electronic apparatus 120 respectively and analyzes the aggressive behaviors so as to obtain a behavior characteristic vector. The behavior prediction module 133 executes a behavior prediction based on the behavior characteristic vector to obtain an evolution bias vector wherein the evolution bias vector relates to the malicious code and the plurality of antivirus systems. For example, the behavior prediction module 133 uses a Markov chain Monte Carlo (MCMC) algorithm and predicts an evolution direction of the aggressive behavior from the behavior characteristic vector, so as to obtain an evolution bias vector $\pi_i$. Also, the antivirus systems included in the monitor module are decided according to elements content included in the evolution bias vector $\pi_i$.

The monitor module is decided to be an admixture model or an association model by the evolution bias vector. If the processor 111 decides that the monitor module is the admixture model, a value of one of the elements obtained in the evolution bias vector obtained is far greater than values of other elements, for example, (0.99, 0.01, 0.10, 0.06). If the processor 111 decides that the monitor module is the association model, a value of one of the elements obtained in the evolution bias vector which is not far greater than values of other elements, for example, (0.81, 0.52, 0.63, 0.50).

Since the monitor apparatus 110 may obtain a feedback from the antivirus system circulated to other electronic apparatuses 120, the monitor apparatus 110 has global knowledge to dynamically adjust the elements in a probability vector or a weight vector. Thus, the evolution bias vector $\pi_i$ obtained from the monitor apparatus 110 can guide the evolution of the monitor module toward a better direction. Also, the monitor apparatus 110 can decide that the evolution bias vector $\pi_i$ used by the monitor module is the probability vector or the weight vector. When an abnormal message is received from one of the electronic apparatuses 120 through the communication device 113, the processor 111 will circulate the monitor module corresponding to the abnormal message to the electronic apparatus 120 which transmits the abnormal message, so as to obtain a corresponding protection result by the monitor module. For example, when it is detected that one of the electronic apparatuses 120 stops transmitting a heartbeat packet, it is determined abnormal.

Figure 2:
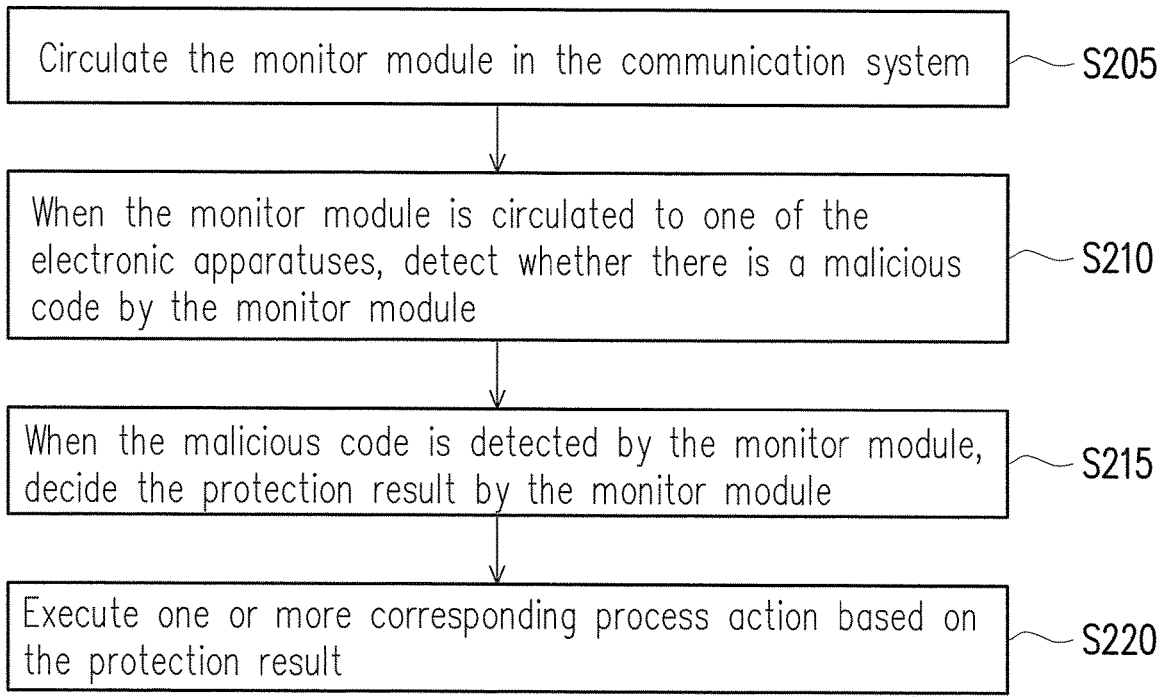
FIG. 2 is a flowchart illustrating a protecting method for malicious code according to an embodiment of the invention.

Each of the steps of the protecting method for malicious code is illustrated with the protecting system as below. FIG. 2 is a flowchart illustrating a protecting method for malicious code according to an embodiment of the invention. Referring to FIG. 1 and FIG. 2, in the step S205, the monitor apparatus 110 circulates the monitor module obtained from the combination of the plurality of antivirus systems in the communication system, so as to monitor the plurality of electronic apparatuses 120 under the communication system. Herein, the monitor apparatus 110 can circulate one monitor module in the communication system at a definite time. Also, the monitor apparatus 110 can transmit the monitor module to the electronic apparatus 120 which is abnormal when receiving an abnormal message.

Then, in the step S210, when the monitor module is circulated to one of the electronic apparatuses 120, whether there is a malicious code in a designated device is detected by the monitor module.

In the step S215, when the monitor module detects that there is a malicious code in the electronic apparatus, a protection result is decided by the monitor module. Herein, the monitor module may be an admixture model and an association model, which including at least two antivirus systems. In a condition that the monitor module is the admixture model, at least one of the antivirus systems is selected as a selected module, and the protection result corresponding to the malicious code is obtained by the selected module. In a condition that the monitor module is the association model, the protection result corresponding to the malicious code is obtained by associating the antivirus systems. That is, in the condition that the monitor module is the admixture model, one of the antivirus systems is trained by the malicious code; in the condition that the monitor module is the association model, all the antivirus systems are trained by the malicious code.

Furthermore, no matter the monitor module is the admixture model or the association model, the monitor module has an evolution bias vector $\pi_i=(p_1, p_2, \ldots, p_m)$. In a condition that the monitor module is the admixture model, the evolution bias vector $\pi_i$ is the probability vector, and a probability of one element in the probability vector is close to 100%, thereby selecting an antivirus system corresponding to the element as the selected module based on the probability. In a condition that the monitor module is the association model, the evolution bias vector $\pi_i$ is the weight vector, thereby deciding a correlation weight between each the antivirus system and the malicious code.

Figure 3:
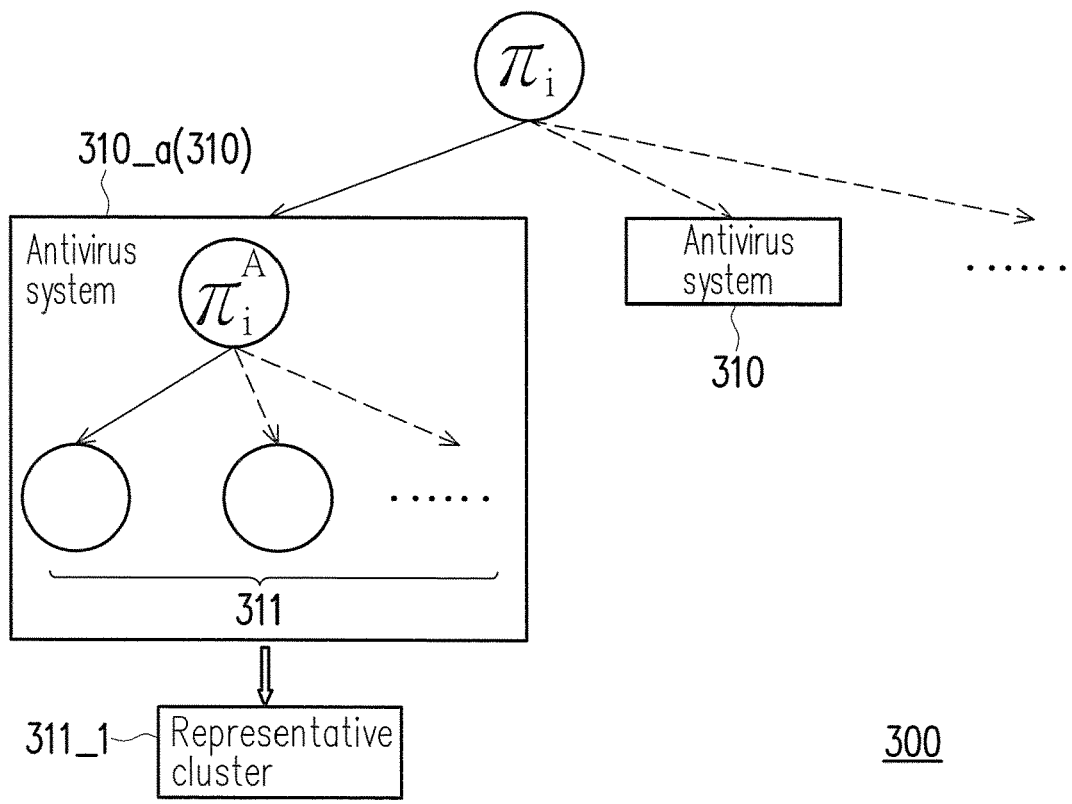
FIG. 3 is a schematic architecture diagram of an admixture model according to an embodiment of the invention.

FIG. 3 is a schematic architecture diagram of an admixture model according to an embodiment of the invention. Referring to FIG. 3, when an admixture model 300 detects the malicious code, based on the evolution bias vector $\pi_i$ (i.e., probability vector) decided by the monitor apparatus 110, one of a plurality of antivirus systems 310 is selected as a selected module 310_a. In the plurality of antivirus systems 310 of FIG. 3, selected antivirus system is represented by connecting with solid lines, and unselected antivirus systems 310 are represented by connecting with dotted lines.

Then, a representative cluster 311_1 is obtained from a plurality of representative clusters 311 based on a probability vector $\pi_i^A$ by the selected module 310_a for the malicious code. The probability vector $\pi_i^A$ is decided by the malicious code patterns encountered by the antivirus system 310_a. A probability of one element in the probability vector $\pi_i^A$ is close to 100%, and a representative cluster 311_1 corresponding to the element is selected based on the probability vector $\pi_i^A$. Herein, the probability vector $\pi_i^A$ may identify the corresponding cluster using a matching method based on a Dirichlet distribution, for example.

Thereafter, the admixture model 300 identifies a set of process actions corresponding to the representative cluster 311_1 using a stochastic analytics algorithm (e.g., Bayesian Linear Regression (BLR) algorithm) according to the evolution bias vector $\pi_i$ and the probability vector $\pi_i^A$, and the set of process actions is used as the protection result. For example, the evolution bias vector $\pi_i$ and the probability vector $\pi_i^A$ are used as a set of characteristic vectors and then input to a BLR model based on the BLR algorithm. The BLR model will return a set of process actions after computation.

Figure 4:
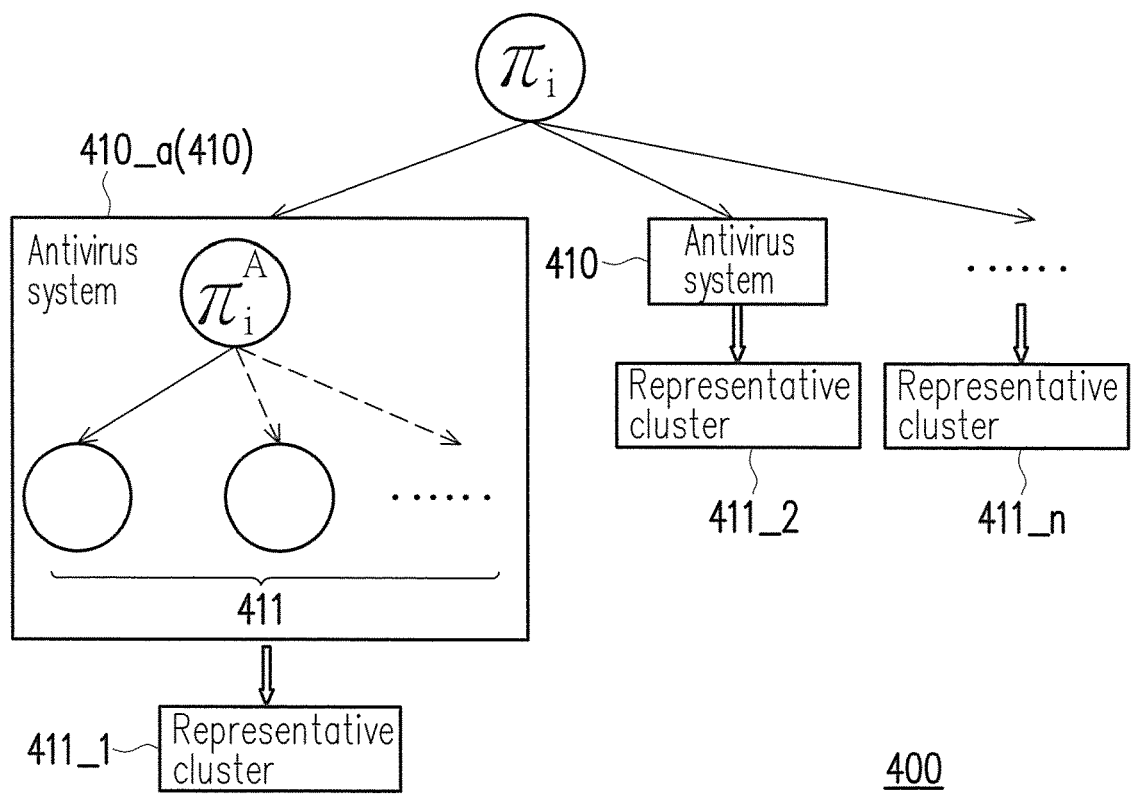
FIG. 4 is a schematic architecture diagram of an association model according to an embodiment of the invention.

FIG. 4 is a schematic architecture diagram of an association model according to an embodiment of the invention. Referring to FIG. 4, when an association model 400 detects the malicious code, the association model 400 determines a correlation weight between each antivirus system 410 and the malicious code based on the evolution bias vector $\pi_i$ (i.e., weight vector) decided by the monitor apparatus 110. Also, each of the antivirus systems 410 can obtain one corresponding representative cluster for the malicious code. In terms of an antivirus system 410_a, a representative cluster 411_1 is obtained from a plurality of representative clusters 411 based on the probability vector $\pi_i^A$. The probability vector $\pi_i^A$ is decided by the malicious code pattern encountered by the antivirus system 410_a. Other antivirus systems 410 are similar, and n of representative clusters 411_1~411_n corresponding to n of the antivirus systems 410 are obtained.

Thereafter, the admixture model 400 identifies a set of corresponding process actions of n of the representative clusters 411_1~411_n using the stochastic analytics algorithm according to the evolution bias vector $\pi_i$ and the probability vector $\pi_i^A$, and the set of process actions is used as the protection result. For example, the evolution bias vector $\pi_i$ and the probability vector $\pi_i^A$ are used as a set of characteristic vectors and then input to a BLR model based on the BLR algorithm. The BLR model will return a set of process actions after computation. In FIG. 4, the solid lines are connected to all of the antivirus systems 410 to represent that all of the antivirus systems 410 are selected to execute the following actions.

Returning to FIG. 2, in the step S220, the monitor module executes one or more corresponding process action based on the protection result. For example, when the protection result includes a plurality of process actions, the monitor module further executes a multi objective optimization algorithm to obtain an optimal objective solution from a plurality of objective solutions (process actions) included in the protection result, so as to set the optimal objective solution as the final process action. For example, the monitor module converts each of the process actions into a multi objective vector $(O_1, O_2, \ldots, O_n)$ and obtains a Pareto set using Pareto efficiency. The set includes one or more optimal process actions. The process action may be removing or deleting suspicious files, for example. If the suspicious files can not be removed, infected network segments or the suspicious files are isolated rapidly. The multi objective optimization algorithm may select the optimal objective solution based on cost, utility, and so on.

Herein, a Bayesian Nonparametric (BNP) model is used in the antivirus system. For example, the BNP model is a Bayesian Case Model (BCM) based on prototype clustering and subspace learning. The BCM characterizes each of the clusters by a prototype $p_s$ and a subspace feature indicator $\omega_s$. Herein, the number of the clusters may be dynamically increased or dynamically decreased.

Herein, the prototype $p_s$ is defined as one observation in x that maximizes $p(p_s|\omega_s,z,x)$. The prototype is a quintessential observation, which can best represent the cluster, wherein x $(x=\{x_1, x_2, \ldots, X_N\})$ is a characteristic vector obtained from the malicious code, and z is a cluster index. The subspace feature indicator $\omega_s$ represents the most important (interesting) characteristic in the characteristic vectors retrieved from malicious code. That is, the subspace feature indicator $\omega_s$ is obtained according to which $\omega_s$ can maximize the probability $p(\omega_s|p_s,z,x)$ Additionally, the monitor apparatus 110 may also update (increase, reduce, or modify) the mapping of the prototype of the BLR model and a set of corresponding process actions in the monitor module, so as to enhance the ability for processing virus of the monitor module. For example, a set of corresponding processing actions is appropriately adjusted by case based reasoning in machine learning.

Additionally, in a condition that there are a plurality of monitor modules in one electronic apparatus 120, the monitor modules negotiate themselves, so as to decide which one to process the malicious code.

Additionally, no matter the monitor module is the admixture model or the association model, the monitor module can be composed of a plurality of admixture models 300, composed of a plurality of association models 400, or composed of the admixture models 300 and the association models 400.

For example, if a first layer of the monitor module is the admixture model, only one of branches thereunder is selected to process. Then, selecting one of the antivirus systems to obtain one representative cluster or selecting all of the antivirus systems (assuming n number) to obtain n of representative clusters is decided according to that the branch is an admixture or an association. On the other hand, if the first layer of the monitor module is the association model, all of the branches thereunder are selected. Then, selecting one of the antivirus systems to obtain one representative cluster or selecting all of the antivirus systems (assuming n number) to obtain n of representative clusters is decided according to that each of the branches is the admixture or the association.

In summary, based on the above embodiments, by the analysis of the monitor apparatus, a variety of the antivirus systems can be combined for the evolution direction of the malicious code to form the monitor module, such that the monitor module moves toward a better direction and evolves independently. A new antivirus system (i.e., monitor module) is generated by a recombination (admixture or association) of the antivirus systems therebetween, and the monitor apparatus circulates the monitor module obtained from a combination of the plurality of antivirus systems in the communication system, so as to monitor each the electronic apparatus under the communication system. Accordingly, a plurality of aggressive behaviors are gathered and analyzed by the monitor apparatus, such that the monitor module is able to evolve independently according to the evolution of the malicious code.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A protecting method for malicious code, comprising:
    circulating a monitor module, which includes a plurality of antivirus systems, to at least one electronic apparatus by a monitor apparatus in a communication system, so as to monitor the at least one electronic apparatus in the communication system;
    in response to the monitor module is circulated to one of the electronic apparatuses in the communication system, detecting whether there is a malicious code by the monitor module;
    in response to the malicious code is detected by the monitor module, analyzing at least one aggressive behavior corresponding to the malicious code received from at least one electronic apparatus to calculate a behavior characteristic vector by the monitor apparatus;
    executing a behavior prediction based on the behavior characteristic vector by the monitor apparatus to predict an evolution direction of the aggressive behavior from the behavior characteristic vector and to calculate an evolution bias vector related to the plurality of antivirus systems based on the evolution direction;
    deciding, by the monitor apparatus, whether the monitor module is an admixture model or an association model based on the evolution bias vector, wherein in a condition that the monitor module is the admixture model, the evolution bias vector is a probability vector, and in a condition that the monitor module is the association model, the evolution bias vector is a weight vector;

determining a protection result by the monitor module; and executing one or more corresponding process actions based on the protection result by the monitor module;

wherein in response to the malicious code is detected by the monitor module, the step of determining the protection result by the monitor module comprises:

in the condition that the monitor module is the admixture model, comprising:

selecting one of the antivirus systems corresponding to an element with a highest probability in the probability vector as a selected module, and determining the protection result corresponding to the malicious code by the selected module;

based on a first probability vector decided by the selected module, identifying a first representative cluster corresponding to the malicious code by the selected module; and using the evolution bias vector calculated by the monitor apparatus and the first probability vector decided by the selected module as a set of characteristic vectors and inputting the set of characteristic vectors to a Bayesian linear regression model to obtain a set of the process actions corresponding to the first representative cluster and using the set of process actions as the protection result; and in the condition that the monitor module is the association model, comprising:

deciding a correlation weight between each of the antivirus systems and the malicious code based on the weight vector, and determining the protection result corresponding to the malicious code by associating all of the antivirus systems included in the monitor module based on the correlation weight;

in each of the antivirus systems, based on a second probability vector decided by each of the antivirus systems, identifying a second representative cluster corresponding to the malicious code in each of the antivirus systems; and using the evolution bias vector calculated by the monitor apparatus and each of the second probability vectors decided by each of the antivirus systems as the set of characteristic vectors and inputting the set of characteristic vectors to the Bayesian linear regression model to obtain the set of the process actions corresponding to the second representative cluster and using the set of process actions as the protection result.

2. The protecting method for malicious code according to claim 1, wherein after the step of determining the protection result by the monitor module, further comprising:

executing a multi objective optimization algorithm to obtain an optimal objective solution from a plurality of objective solutions comprised in the protection result, so as to set the optimal objective solution as the final process action.

3. The protecting method for malicious code according to claim 1, further comprising:

when one of the electronic apparatuses in the communication system is abnormal, circulating the monitor module to the electronic apparatus which is abnormal by the monitor apparatus, and detecting whether there is the malicious code by the monitor module.

4. The protecting method for malicious code according to claim 1, wherein the antivirus systems included in the monitor module are a tree hierarchical structure, and a plurality of layers of the tree hierarchical structure belong to the admixture model or the association model respectively.

5. A protecting system for malicious code, comprising:

an electronic apparatus, located in a communication system; and a hardware server, located in the communication system, configured to communicate with the electronic apparatus by a communication device, and to circulate a monitor module, which includes a plurality of antivirus systems, to the electronic apparatus, so as to monitor the electronic apparatus;

wherein the electronic apparatus is configured to detect whether there is a malicious code by the monitor module in response to the monitor module is circulated to the electronic apparatus;

wherein the hardware server is further configured to analyze at least one aggressive behavior corresponding to the malicious code received from the electronic apparatus to calculate a behavior characteristic vector, to execute a behavior prediction based on the behavior characteristic vector to predict an evolution direction of the aggressive behavior from the behavior characteristic vector and to calculate an evolution bias vector based on the evolution direction wherein the evolution bias vector relates to the malicious code and the antivirus systems comprised in the monitor module and to decide the monitor module to be an admixture model or an association model based on the evolution bias vector, wherein in a condition that the monitor module is the admixture model, the evolution bias vector is a probability vector, and in a condition that the monitor module is the association model, the evolution bias vector is a weight vector, in response to the malicious code is detected by the monitor module;

wherein the electronic apparatus is further configured to determine a protection result by the monitor module and to execute one or more corresponding process actions based on the protection result in response to the malicious code is detected by the monitor module;

wherein the electronic apparatus selects one of the antivirus systems corresponding to an element with a highest probability in the probability vector as a selected module and determines the protection result corresponding to the malicious code by the selected module, based on a first probability vector decided by the selected module, identifies a first representative cluster corresponding to the malicious code by the selected module, and uses the evolution bias vector calculated by the monitor apparatus and the first probability vector decided by the selected module as a set of characteristic vectors and input the set of characteristic vectors to a Bayesian linear regression model to obtain a set of the process actions corresponding to the first representative cluster and using the set of process actions as the protection result in response to the malicious code is detected by the monitor module in the condition that the monitor module is the admixture model; and wherein the electronic apparatus is further configured to decide a correlation weight between each of the antivirus systems and the malicious code based on the weight vector and to associate all of the antivirus systems included in the monitor module to determine the protection result corresponding to the malicious code based on the correlation weight, in each of the antivirus systems, based on a second probability vector decided by each of the antivirus systems, identify a second representative cluster corresponding to the malicious code in each of the antivirus systems, and use the evolution bias vector calculated by the monitor apparatus and each of the second probability vectors decided by each of the antivirus systems as the set of characteristic vectors and input the set of characteristic vectors to the Bayesian linear regression model to obtain the set of the process actions corresponding to the second representative cluster and using the set of process actions as the protection result, in response to the malicious code is detected by the monitor module in the condition that the monitor module is the association model.

6. The protecting system for malicious code according to claim 5, wherein the electronic apparatus is further configured to execute a multi objective optimization algorithm after the electronic apparatus determines the protection result by the monitor module to obtain an optimal objective solution from a plurality of objective solutions comprised in the protection result, so as to set the optimal objective solution as the final process action.

7. The protecting system for malicious code according to claim 5, wherein the hardware server is further configured to circulate the monitor module to the electronic apparatus and detects whether there is the malicious code by the monitor module when the electronic apparatus is abnormal.

8. The protecting system for malicious code according to claim 5, wherein the antivirus systems comprised in the monitor module are a tree hierarchical structure, and a plurality of layers of the tree hierarchical structure belong to the admixture model or the association model respectively.

9. A monitor apparatus, comprising:
a communication chip configured to establish a connection with an electronic apparatus in a communication system;
a storage device, comprising a behavior analysis module and a behavior prediction module; and
a processor, coupled to the communication chip and the storage device, wherein the processor is configured to circulate a monitor module, which includes a plurality of antivirus systems, to the electronic apparatus in the communication system by the communication chip, so as to monitor the electronic apparatus in the communication system,
wherein the processor is configured to drive the behavior analysis module to analyze at least one aggressive behavior corresponding to at least one malicious code received from the electronic apparatus to calculate a behavior characteristic vector, and the processor is configured to drive the behavior prediction module to execute a behavior prediction based on the behavior characteristic vector to predict an evolution direction of the aggressive behavior from the behavior characteristic vector and to calculate an evolution bias vector corresponding to the antivirus systems comprised in the monitor module based on the evolution direction, so as to decide that the monitor module is an admixture model or an association model by the evolution bias vector, wherein in a condition that the monitor module is the admixture model, the evolution bias vector is a probability vector, and in a condition that the monitor module is the association model, the evolution bias vector is a weight vector,
wherein in the condition that the monitor module is the admixture model, the monitor module is used to
select one of the antivirus systems corresponding to an element with a highest probability in the probability vector as selected module to determine a protection result,
based on a first probability vector decided by the selected module, identify a first representative cluster corresponding to the malicious code by the selected module, and
use the evolution bias vector calculated by the monitor apparatus and the first probability vector decided by the selected module as a set of characteristic vectors and input the set of characteristic vectors to a Bayesian linear regression model to obtain a set of the process actions corresponding to the first representative cluster and using the set of process actions as the protection result;
wherein in the condition that the monitor module is the association model, the monitor module is used to
decide a correlation weight between each of the antivirus systems and the malicious code based on the weight vector and associate all of the antivirus systems included in the monitor module to determine the protection result based on the correlation weight,
in each of the antivirus systems, based on a second probability vector decided by each of the antivirus systems, identify a second representative cluster corresponding to the malicious code in each of the antivirus systems; and
use the evolution bias vector calculated by the monitor apparatus and each of the second probability vectors decided by each of the antivirus systems as the set of characteristic vectors and input the set of characteristic vectors to the Bayesian linear regression model to obtain the set of the process actions corresponding to the second representative cluster and using the set of process actions as the protection result.

10. The monitor apparatus according to claim 9, wherein when the electronic apparatus is abnormal, the processor is configured to circulate the monitor module to the electronic apparatus, so that the protection result is determined by the monitor module.

* * * * *